(12) United States Patent
Purnomo et al.

(10) Patent No.: US 11,853,193 B2
(45) Date of Patent: Dec. 26, 2023

(54) INVERSE PERFORMANCE DRIVEN PROGRAM ANALYSIS

(71) Applicant: Advanced Micro Devices, Inc., Santa Clara, CA (US)

(72) Inventors: Budirijanto Purnomo, Santa Clara, CA (US); Chen Shen, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 230 days.

(21) Appl. No.: 17/514,398

(22) Filed: Oct. 29, 2021

(65) Prior Publication Data

US 2023/0140822 A1 May 4, 2023

(51) Int. Cl.
*G06F 11/36* (2006.01)
*G06F 9/50* (2006.01)
*G06F 9/54* (2006.01)
*G06F 8/41* (2018.01)

(52) U.S. Cl.
CPC .......... *G06F 11/3612* (2013.01); *G06F 8/433* (2013.01); *G06F 9/5038* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 2012/0084789 A1* | 4/2012 | Iorio | G06F 9/5066 718/105 |
| 2018/0107521 A1* | 4/2018 | Benke | G06F 11/3433 |
| 2022/0091883 A1* | 3/2022 | Gadre | G06F 9/4881 |
| 2022/0138004 A1* | 5/2022 | Nandakumar | G06N 20/00 718/102 |
| 2022/0413992 A1* | 12/2022 | Nguyen | G06F 16/9024 |

\* cited by examiner

*Primary Examiner* — Qing Chen
(74) *Attorney, Agent, or Firm* — HICKMAN BECKER BINGHAM LEDESMA LLP

(57) ABSTRACT

An approach is provided for a program profiler to implement inverse performance driven program analysis, which enables a user to specify a desired optimization end state and receive instructions on how to implement the optimization end state. The program profiler accesses profile data from an execution of a plurality of tasks executed on a plurality of computing resources. The program profiler constructs a dependency graph based on the profile data. The program profiler causes a user interface to be presented that represents the profile data. The program profiler receives an input for a modification of one or more execution attributes of one or more target tasks. The program profiler determines that the modification is projected to improve a performance metric while maintaining a validity of the dependency graph. The program profiler presents, via the user interface, one or more steps to implement the modification.

17 Claims, 5 Drawing Sheets

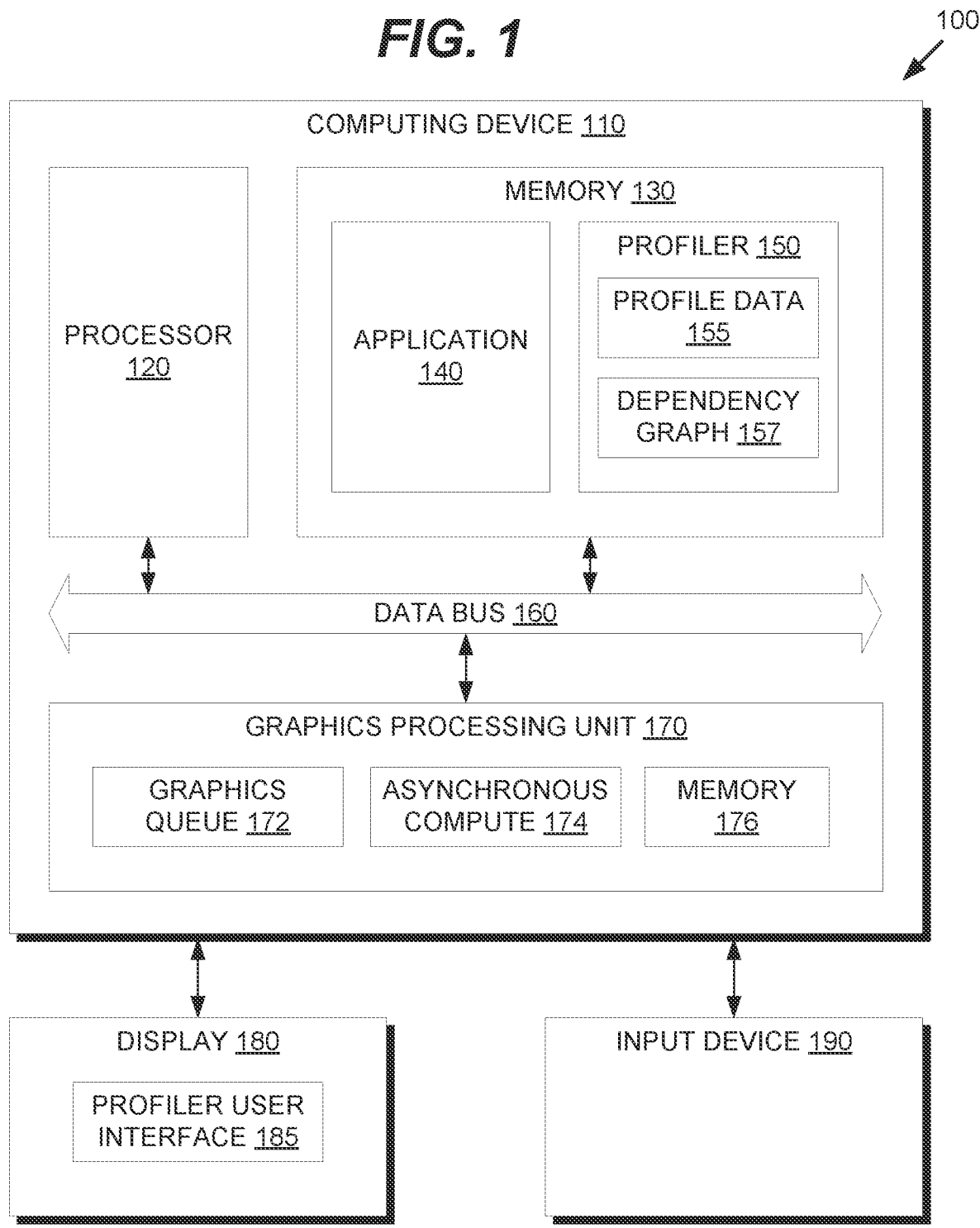

FIG. 2A
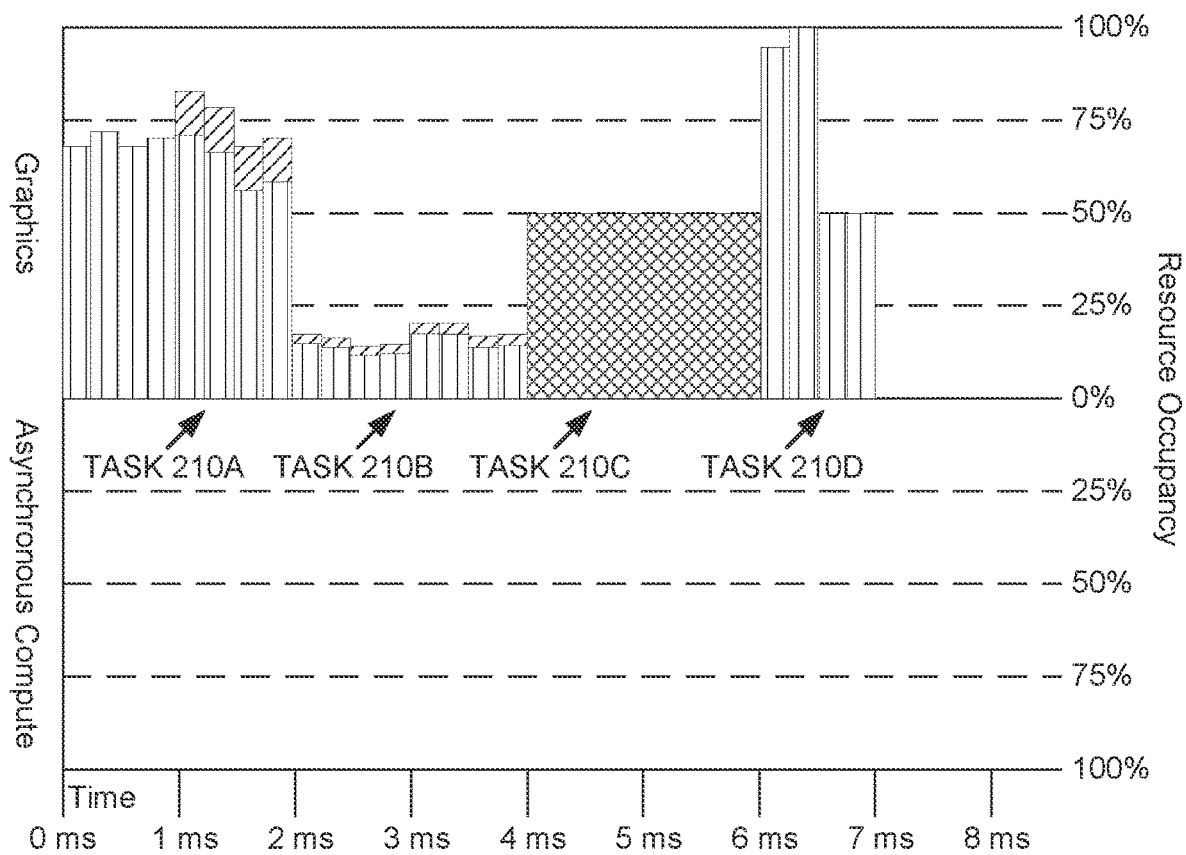
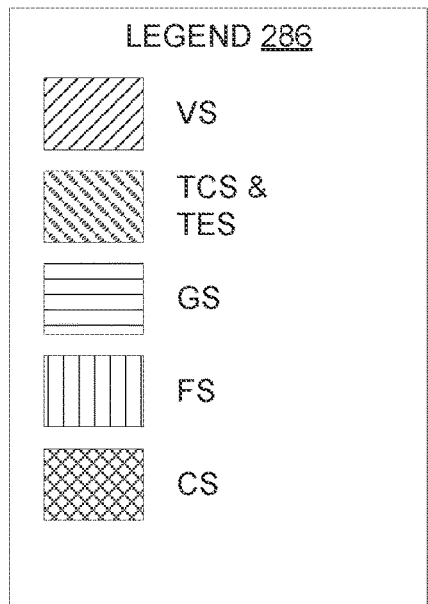
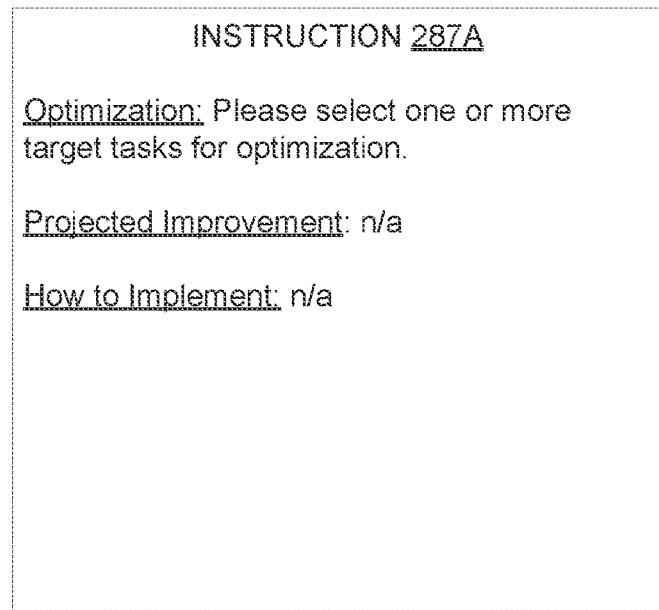

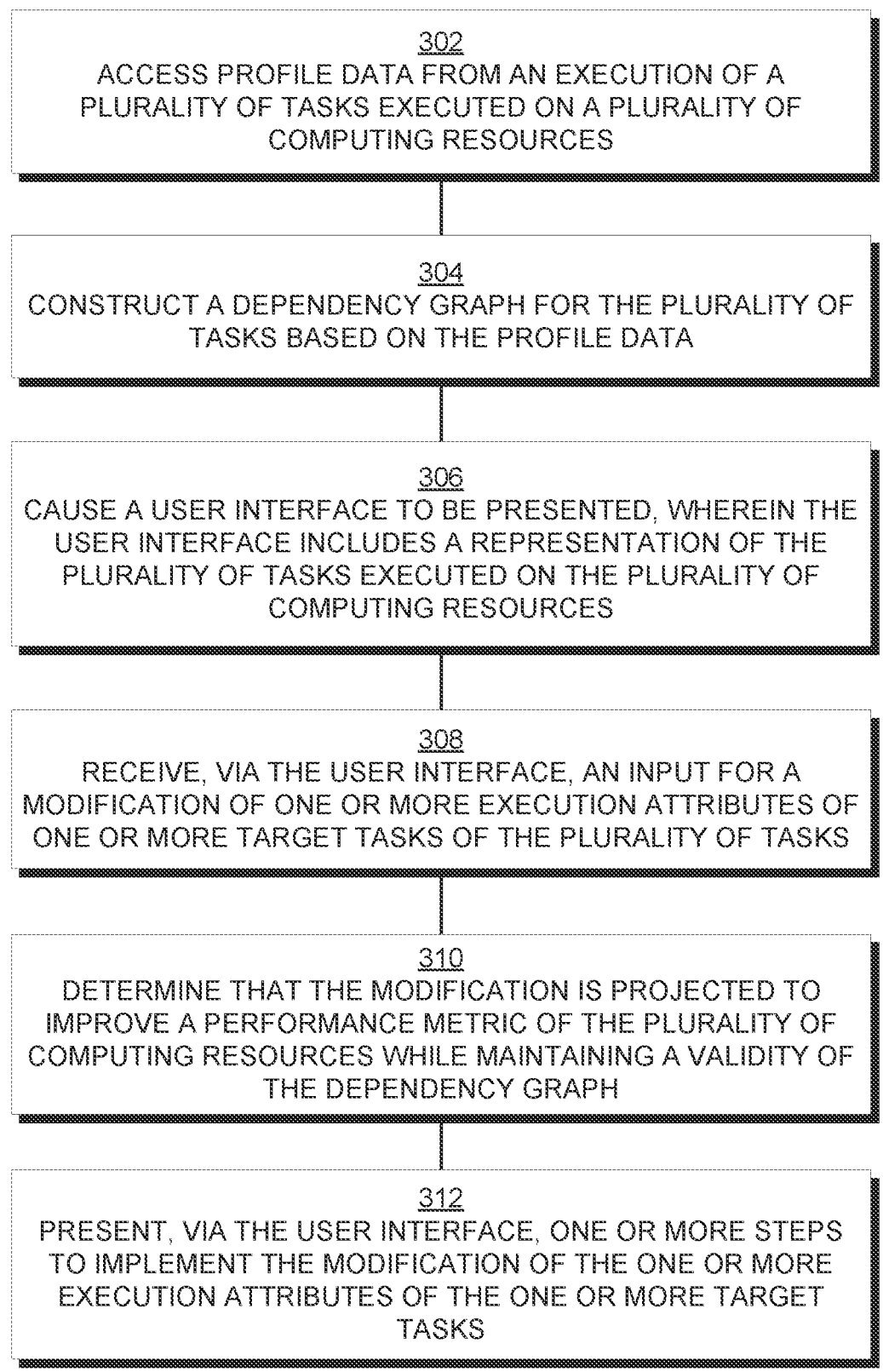

INVERSE PERFORMANCE DRIVEN PROGRAM ANALYSIS

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Software developers may use various analysis tools, such as program profilers, to better understand performance bottlenecks and resource usage. For an application to be optimized, a trace or profile may be generated that can be analyzed using a graphical user interface (GUI), for example by illustrating the frequency and duration of function calls during program execution, as well as the associated computing resources that are utilized, such as processor and memory utilization. With this knowledge, developers may better understand how to direct their optimization efforts to meet performance targets while reducing resource usage, thus enabling the application to run on a wider variety of hardware while minimizing power consumption. To implement such optimizations, developers may use their experience and intuition to formulate an optimization process, wherein various proposed modifications are iteratively applied to the application and the application is retested using the program profiler to determine which modifications best improve performance or resource usage.

However, this iterative optimization process may inefficiently expend scarce development and computing resources, as several different modifications may need to be explored, implemented, recompiled, and profiled before a viable optimization strategy is found. Further, complex applications that use specialized hardware may present special challenges for developers. For example, graphics processing units (GPUs) may include several different types of dedicated processing units that execute programs using high levels of parallelism and deep multi-stage pipelines, presenting various synchronization issues and interlocking performance effects that can be difficult to parse. Thus, there is a need for an approach that provides resource efficient workflows for application optimization while improving ease of use for applications using GPUs or other specialized hardware.

BRIEF DESCRIPTION OF THE DRAWINGS

Implementations are depicted by way of example, and not by way of limitation, in the figures of the accompanying drawings and in which like reference numerals refer to similar elements.

FIG. 1 is a block diagram that depicts a system for implementing inverse performance driven program analysis, as described herein.

FIG. 2A is a diagram that depicts an example graphical user interface (GUI) of a program profiler implementing inverse performance driven program analysis.

FIG. 3 is a flow diagram that depicts an approach for implementing inverse performance driven program analysis.

DETAILED DESCRIPTION

Figure 2B:
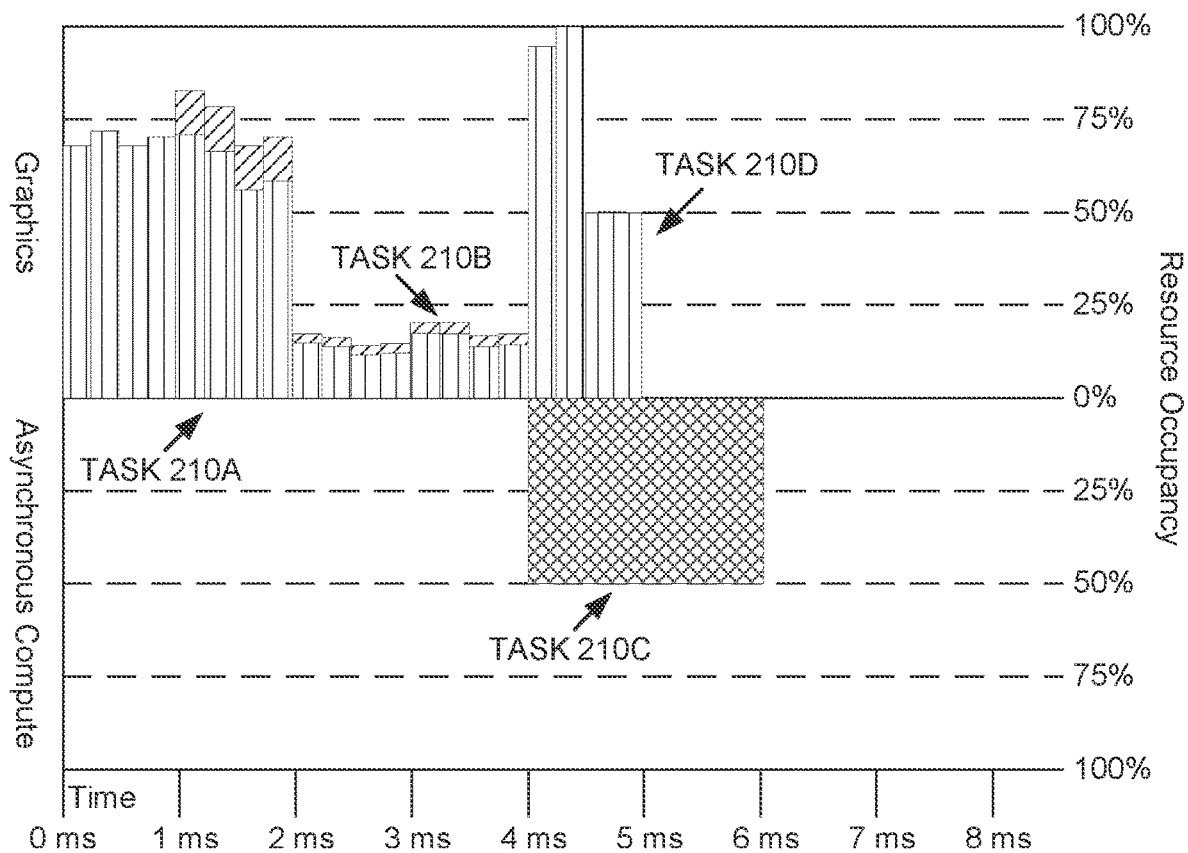
FIG. 2B is a diagram that depicts the GUI of FIG. 2A after receiving a user input for changing an assigned computing resource of a target task.

In the following description, for the purposes of explanation, numerous specific details are set forth in order to provide a thorough understanding of the implementations. It will be apparent, however, to one skilled in the art that the implementations are be practiced without these specific details. In other instances, well-known structures and devices are depicted in block diagram form in order to avoid unnecessarily obscuring the implementations.

I. Overview
    II. Architecture
    III. Program Profiler User Interface
    IV. Optimization Examples

I. Overview

An approach is provided for a program profiler to implement inverse performance driven program analysis, which enables a user to specify a desired optimization end state and receive instructions on how to implement the optimization end state. The program profiler accesses profile data from an execution of a plurality of tasks executed on a plurality of computing resources. The program profiler constructs a dependency graph based on the profile data. The program profiler causes a user interface to be presented that represents the profile data. The program profiler receives an input for a modification of one or more execution attributes of one or more target tasks and determines that the modification is projected to improve a performance metric while maintaining a validity of the dependency graph. The program profiler then presents, via the user interface, one or more steps to implement the modification.

Techniques discussed herein enable a user to define an optimized end state and then reach that optimized end state by following instructions provided by the program profiler. Since the program profiler determines a dependency graph of the application being profiled, the program profiler can intelligently guide the user to viable optimized end states by determining and enforcing hard constraints while allowing soft constraints to be modified, such as application defined execution order. In this manner, the user can immediately visualize both the potential performance improvement and the programming effort to implement such improvement before modifying application code. By avoiding iterative modification testing, development time can be reduced while improving device performance by conserving limited computational resources such as processor cycles, memory usage, and network bandwidth. Thus, a resource efficient workflow for application optimization is provided.

II. Architecture

FIG. 1 is a block diagram that depicts a system 100 for implementing inverse performance driven program analysis as described herein. System 100 includes computing device 110, display 180, and input device 190. Computing device 110 includes processor 120, memory 130, data bus 160, and graphics processing unit (GPU) 170. Memory 130 includes application 140 and profiler 150. Profiler 150 includes profile data 155 and dependency graph 157. GPU 170 includes graphics queue 172, asynchronous compute 174, and memory 176. Display 180 includes profiler user interface 185. The components of system 100 are only exemplary and any configuration of system 100 may be used according to the requirements of application 140.

In one implementation, such as depicted in system 100 of FIG. 1, a developer may use computing device 110 to execute, develop, and optimize application 140. For example, an integrated development environment (IDE) may be utilized to develop application 140, and profiler 150 may be used to trace or profile application 140 to generate profile data 155 and dependency graph 157. Profiler user interface 185 may then be depicted on display 180 to represent profile data 155 to the user. In some implementations, the IDE and profiler 150 may be executed on a remote workstation or terminal separate from computing device 110.

Application 140 may utilize processor 120, memory 130, data bus 160, GPU 170, and other computing resources not specifically depicted. Processor 120 may be any type of general-purpose single or multi core processor, or a specialized processor such as application-specific integrated circuit (ASIC) or field programmable gate array (FPGA), and more than one processor 120 may also be present. Memory 130 may be any type of memory, such as a random access memory (RAM) or other dynamic storage device. Data bus 160 may be any high-speed interconnect for communications between components of computing device 110, such as a Peripheral Component Interconnect (PCI) Express bus, an Infinity Fabric, or an Infinity Architecture. GPU 170 may be any type of specialized hardware for graphics processing, which may be addressable using various graphics application programming interfaces (APIs) such as DirectX, Vulkan, OpenGL, and OpenCL.

As depicted in FIG. 1, GPU 170 may include several components, such as graphics queue 172, which may include computational units tailored for graphics processing, and asynchronous compute 174, which may include computational units tailored for compute tasks. Graphics queue 172 and asynchronous compute 174 may process tasks independently and in parallel. Memory 176 may include high bandwidth, low latency memory suitable for graphics and compute processing. While not specifically depicted, a data bus may also be used to allow communication between components of GPU 170. While the specific example depicted in FIG. 1 is focused on GPU 170, the principles of this application are generally applicable to any configuration of hardware resources. For example, application 140 may be configured to utilize a dedicated machine learning processor instead of, or in addition, to GPU 170.

After using profiler 150 to generate profile data 155, for example by executing a trace or profiling on application 140, the user may view profiler user interface 185 on display 180. Profiler user interface 185 may enable the user to use input device 190, such as a mouse or touch or pen input, to submit proposed optimizations for application 140. When profiler 150 determines that a proposed optimization maintains a validity of dependency graph 157, profiler user interface 185 may be updated to show the projected performance improvement from the proposed optimization, as well as a list of instructions for implementing the proposed optimization in application 140, as described further below in conjunction with FIGS. 2A-2C and FIG. 3. In this manner, the user can simply specify a desired end optimization state using profiler user interface 185, and a list of instructions can be received by the user to determine the effort required for implementation. Thus, several different optimization routes can be quickly evaluated before modifying code in application 140. Further, implementation of a proposed modification may be presented to the user via an easily understood step-by-step list of instructions, thereby facilitating implementation even when complex hardware is utilized, such as GPU 170.

III. Program Profiler User Interface

Referring now to FIG. 2A, an example profiler user interface 285A is illustrated, which may correspond to profiler user interface 185 from FIG. 1. As depicted in profiler user interface 285A, task occupancy from profile data 155 for various hardware resources of GPU 170 are illustrated in histogram form, which includes "Graphics" corresponding to graphics queue 172 and "Asynchronous Compute" corresponding to asynchronous compute 174. The task occupancy may correspond to the rendering of a graphics frame targeting a certain framerate, such as 60 frames per second or approximately 16.7 milliseconds per frame, or 120 frames per second or approximately 8.3 milliseconds per frame. The data resolution and time scale of the histogram may be adjustable according to user preference. While a histogram is specifically used in profiler user interface 285A, any data representation may be utilized.

The histogram may represent in-flight GPU programs over time, which may be identified according to threads grouped by a fixed size such as 32 or 64 threads, also referred to as wavefronts or warps. Wavefronts may execute the same GPU kernel program in parallel and in lockstep. As depicted in legend 286, wavefront occupancy may be visually identified by pattern or color, which may correspond to a specific GPU API pipeline stage, such as VS for vertex shader, TCS & TES for tessellation control shader and tessellation evaluation shader, GS for geometry shader, FS for fragment shader, and CS for compute shader.

For simplicity of illustration, profiler user interface 285A shows an example of profile data 155 wherein four tasks are executed in sequential order, or task 210A executing for approximately 2 milliseconds, followed by task 210B executing for approximately 2 milliseconds, followed by task 210C executing for approximately 2 milliseconds, and finally followed by task 210D for approximately 1 millisecond. However, profile data 155 could also indicate several tasks running in parallel with complex synchronization requirements.

Returning to the example depicted in profiler user interface 285A, profiler 150 may parse profile data 155 to construct dependency graph 157, wherein task 210B depends on the output of task 210A, task 210C depends on the output of task 210B, and task 210D is independent of tasks 210A-210C. Since application 140 may interface with GPU 170 using standardized graphics API calls that are reflected in profile data 155, the dependencies in dependency graph 157 can be constructed according to synchronization primitives, shader resource usage, driver and firmware requirements, and other known factors.

Further, the dependencies in dependency graph 157 can be classified as either hard constraints that must be satisfied, or soft constraints that can be potentially relaxed to meet optimization goals. For example, certain driver, API, hardware, or firmware restrictions may be classified as hard constraints, whereas execution order of certain tasks defined in application 140 may be classified as soft constraints. Thus, according to these considerations, profiler 150 may classify task 210B depending on the output of task 210A as a hard constraint, whereas profiler 150 may classify task 210C depending on the output of task 210B as a soft constraint. Since task 210D was determined to be independent of tasks 210A-210C, task 210D may be considered unconstrained and freely movable in the histogram.

As depicted in instruction 287A, the user is instructed to select one or more target tasks for optimization. Thus, the user may select one or more target tasks from the histogram for optimization. Optimizations may include modifying one or more execution attributes, such as changing an assigned hardware resource, e.g. from graphics to asynchronous compute or vice versa. Another execution attribute modification may include changing an execution order such that target tasks occur at different times and/or with greater parallelization with other tasks. A proposed optimization may be determined to be valid by profiler 150 when the proposed optimization is projected to improve at least one performance metric of GPU 170 while maintaining the validity of dependency graph 157. As discussed above, dependency graph 157 may be valid while the hard constraints are satisfied. When the proposed optimization is determined to be valid, then instruction 287A may be updated to include the proposed optimization, the projected performance improvement, and step-by-step instructions on how to implement the proposed optimization. The histogram may also be updated to reflect the proposed optimization.

IV. Optimization Examples

Figure 2C:
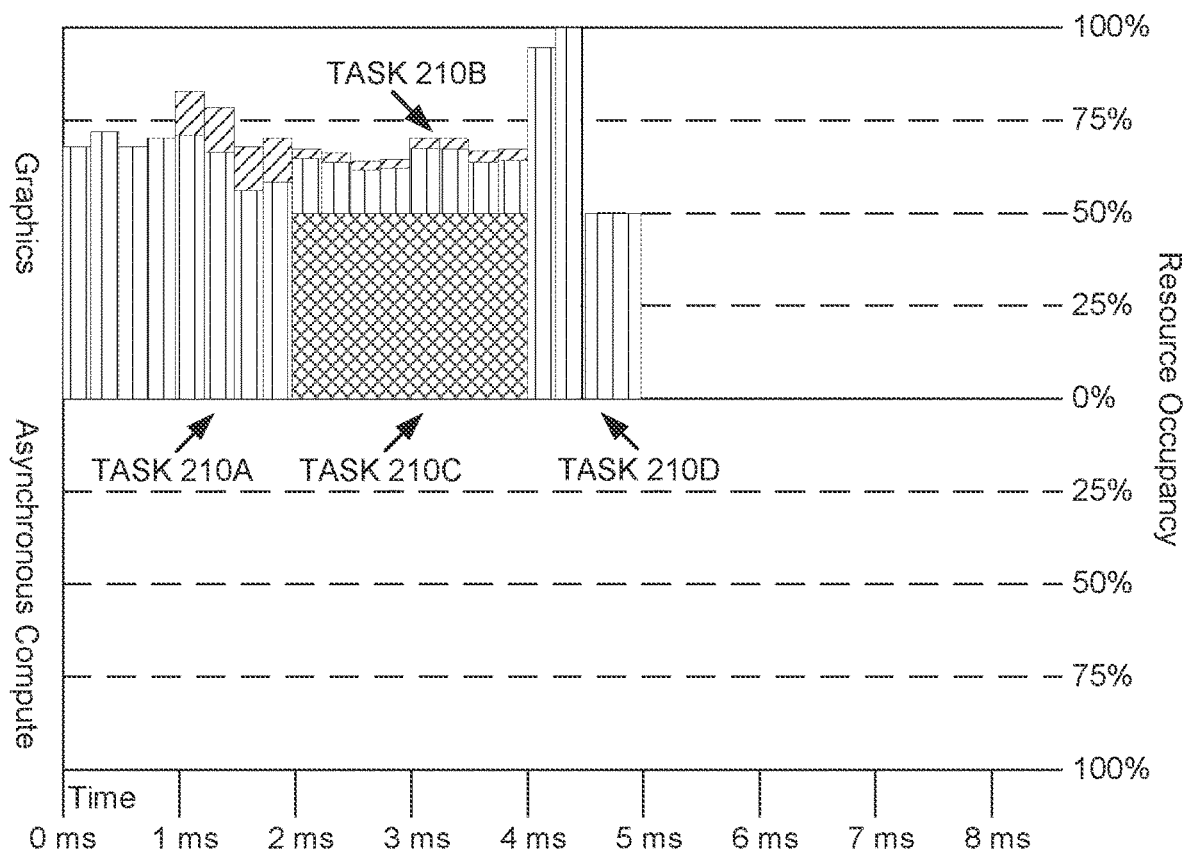
FIG. 2C is a diagram that depicts the GUI of FIG. 2A after receiving a user input for changing an execution order of a target task.

To illustrate an example process for performing inverse performance driven program analysis, flow diagram 300 of FIG. 3 may be described with respect to FIG. 1 and profiler user interface 285B depicted in FIG. 2B or profiler user interface 285C depicted in FIG. 2C. Profiler user interfaces 285B-285C may reflect example updates of profiler user interface 285A after flow diagram 300 is performed with different user inputs indicating different proposed optimizations.

Flow diagram 300 depicts an approach for performing inverse performance driven program analysis wherein blocks 302, 304, 306, 308, 310, and 312 may be performed on processor 120 of computing device 110. Alternatively, flow diagram 300 may be performed on a processor of a remote terminal or workstation.

In block 302, processor 120 accesses profile data 155 from an execution of application 140, which includes tasks 210A, 210B, 210C, and 210D, which are executed on graphics queue 172 and asynchronous compute 174 of GPU 170. For example, profiler 150 may have been previously instructed to perform a trace of application 140, which results in profile data 155 being generated and stored in memory 130 for future access by block 302.

In block 304, processor 120 constructs dependency graph 157 for tasks 210A-210D based on profile data 155. As described above, dependency graph 157 may be constructed based on known graphics API calls and synchronization information available from profile data 155. Further, as described above, the constraints in dependency graph 157 may be categorized as either soft or hard constraints, wherein maintaining a validity of dependency graph 157 is based on satisfying the hard constraints.

In block 306, processor 120 causes profiler user interface 185 to be presented on display 180, wherein profiler user interface 185 includes a histogram representation of tasks 210A-210D executed on graphics queue 172 and asynchronous compute 174 of GPU 170. As discussed above, a histogram is one example representation and other representations are also possible.

In block 308, processor 120 receives, via profile user interface 185, an input from input device 190 for a modification of one or more execution attributes of one or more target tasks of tasks 210A-210D. For example, the input may correspond to a click and drag movement of one or more target tasks to a desired position in the histogram. Referring to FIG. 2B, one example input may correspond to a click and drag operation that moves task 210C from the upper "Graphics" region representing graphics queue 172 to the lower "Asynchronous Compute" region representing asynchronous compute 174. Referring to FIG. 2C, another example input may correspond to a click and drag operation that moves task 210C leftward such that task 210C starts at a beginning time of 2 milliseconds instead of the original beginning time of 4 milliseconds.

In block 310, processor 120 determines that the proposed modification or optimization from block 308 is projected to improve a performance metric of GPU 170 while maintaining a validity of dependency graph 157. Example performance metrics may include reducing a total execution time of application 140 on GPU 170, including graphics queue 172 and asynchronous compute 174, or reducing a memory usage or memory footprint of application 140 on memory 176, or reducing a latency of API calls using graphics queue 172 or asynchronous compute 174. For the examples depicted in FIGS. 2B and 2C, the performance metric may correspond to reducing a total execution time of application 140 on GPU 170. If the proposed optimization reduces a performance metric of GPU 170, then the proposed optimization may be rejected, and the user may be instructed to try an alternative proposal.

Referring to FIG. 2B, processor 120 may determine that the proposed modification of assigning task 210C from graphics queue 172 to asynchronous compute 174 is projected to reduce total execution time by at least 1 millisecond, since the reassignment of task 210C frees up the occupancy of graphics queue 172 to enable task 210D to be executed in parallel with task 210C. Since task 210D may be determined to be independent of tasks 210A-210C, as discussed above in section III, task 210D may potentially be relocated even earlier in the histogram, and the validity of dependency graph 157 may still be upheld. However, processor 120 may determine it is preferable to execute task 210D in parallel with task 210C for latency or other purposes. When multiple alternative optimization strategies are available, the different strategies may be presented to the user for consideration and selection.

Referring to FIG. 2C, processor 120 may determine that the proposed modification of adjusting the execution order of task 210C to start from a beginning time of 2 milliseconds instead of 4 milliseconds is projected to reduce total execution time by at least 2 milliseconds, since the execution order adjustment enables task 210B to be executed in parallel with task 210C. Further, the proposed modification may be determined to maintain a validity of dependency graph 157 since the constraint of task 210C depending on the output of task 210B may be categorized as a soft dependency, as discussed above in section III.

In block 312, processor 120 presents, via profiler user interface 185, one or more steps to implement the modification from block 308. The steps may include any number of instructions for modifying application 140, such as changing an execution order of one or more function calls, changing a first function call to instead use a second function call, changing one or more compilation parameters, or changing one or more data structures.

For example, referring to FIG. 2B, processor 120 may present instruction 287B in profiler user interface 285B, wherein instruction 287B provides the step of modifying API calls matching "computeFunctionGPU(foo, bar, . . . )" to instead call "computeFunctionASYNC(foo, bar, . . . )" at lines 155 and 300 of the "render.cs" source code file. Since task 210C entirely uses the CS or compute shader pipeline stage, as indicated by legend 286, task 210C may be readily executed on asynchronous compute 174 by simply changing an API call function from one function to another function. If program debug information is unavailable, then the matching source code lines may be unavailable, in which case the user may instead perform a quick find and replace operation to modify the source code of application 140 accordingly. The user can therefore conclude that the implementation cost of the proposed optimization is low, and that a reduction of 1 millisecond in total execution time can be readily achieved.

On the other hand, referring to FIG. 2C, processor 120 may present instruction 287C in profiler user interface 285C, wherein instruction 287C provides the steps of (1) modifying task 210C such that the variable "baz" is independent from task 210B, and (2) submitting task 210C immediately after the completion of task 210A. Thus, the user may need to refactor the code of task 210C before the proposed optimization is possible, which may require significant development time and computing resources. The user can therefore conclude that the implementation cost of the proposed optimization is high, and that a reduction of 2 milliseconds in total execution time can be achieved, but with some programming effort.

Similarly, referring to FIG. 2B, if task 210C did not use compute shaders or a different computing resource was assigned to task 210C, such as a machine learning processor, then implementation may not be so simple. In this case, instruction 287B may include more involved programming steps to implement the proposed optimization, rather than simply replacing one function with another function. The user can decide whether the proposed optimization is justified by the required implementation steps depicted in instruction 287B.

Note that instructions 287B, 287C, and other step-by-step optimization instructions can be obtained by simply experimenting with different proposed optimizations to various target tasks without having to modify any code in application 140. Further, since profiler 150 maintains the validity of dependency graph 157, the user is freed from having to manually consider the potentially complex synchronization effects of proposed optimizations. By using the described inverse performance driven program analysis to avoid an iterative profiling of application 140, an effective optimization strategy can be quickly found with reduced programming effort, thereby improving the efficiency and resource utilization of application optimization workflows, particularly for applications using specialized hardware such as GPUs.

The invention claimed is:

1. A method comprising:
accessing profile data from an execution of a plurality of tasks executed on a plurality of computing resources;
constructing a dependency graph for the plurality of tasks executed on the plurality of computing resources based on the profile data;
causing a user interface to be presented, wherein the user interface includes a representation of the plurality of tasks executed on the plurality of computing resources;
receiving, via the user interface, an input for a modification of one or more execution attributes of one or more target tasks of the plurality of tasks executed on the plurality of computing resources;
determining that the modification of the one or more execution attributes of the one or more target tasks of the plurality of tasks executed on the plurality of computing resources is projected to improve a performance metric of the plurality of computing resources while maintaining a validity of the dependency graph;
presenting, via the user interface, one or more steps to implement the modification of the one or more execution attributes of the one or more target tasks of the plurality of tasks executed on the plurality of computing resources; and
updating the user interface to reflect the modification of the one or more execution attributes of the one or more target tasks of the plurality of tasks executed on the plurality of computing resources, wherein the updating of the user interface includes the projected improvement to the performance metric of the plurality of computing resources.

2. The method of claim 1, wherein the modification of the one or more execution attributes of the one or more target tasks of the plurality of tasks executed on the plurality of computing resources comprises changing an execution order of the one or more target tasks of the plurality of tasks executed on the plurality of computing resources.

3. The method of claim 1, wherein the modification of the one or more execution attributes of the one or more target tasks of the plurality of tasks executed on the plurality of computing resources comprises changing an assignment of the plurality of computing resources for the one or more target tasks of the plurality of tasks executed on the plurality of computing resources.

4. The method of claim 1, wherein the plurality of tasks executed on the plurality of computing resources comprises graphics processing unit (GPU) application programming interface (API) calls.

5. The method of claim 1, wherein constructing the dependency graph for the plurality of tasks executed on the plurality of computing resources comprises classifying dependencies as hard dependencies defined at least in part by one or more of driver and application programming interface (API) dependencies or soft dependencies defined at least in part by an execution order of the plurality of tasks executed on the plurality of computing resources, and wherein the validity of the dependency graph is maintained when the hard dependencies are satisfied.

6. The method of claim 1, wherein the performance metric of the plurality of computing resources comprises at least one of:
a reduction of total execution time of the plurality of computing resources;
a reduction of memory usage of the plurality of computing resources; or
a reduction of latency of the plurality of computing resources.

7. The method of claim 1, wherein the one or more steps to implement the modification of the one or more execution attributes of the one or more target tasks of the plurality of tasks executed on the plurality of computing resources comprise at least one of:
changing an execution order of one or more function calls;
changing a first function call to instead use a second function call;

changing one or more compilation parameters; or changing one or more data structures.

8. A computing device comprising:

a processor; and a memory storing instructions which, when executed by the processor, cause the processor to:

access profile data from an execution of a plurality of tasks executed on a plurality of computing resources;

construct a dependency graph for the plurality of tasks executed on the plurality of computing resources based on the profile data;

cause a user interface to be presented, wherein the user interface includes a representation of the plurality of tasks executed on the plurality of computing resources;

receive, via the user interface, an input for a modification of one or more execution attributes of one or more target tasks of the plurality of tasks executed on the plurality of computing resources;

determine that the modification of the one or more execution attributes of the one or more target tasks of the plurality of tasks executed on the plurality of computing resources is projected to improve a performance metric of the plurality of computing resources while maintaining a validity of the dependency graph;

present, via the user interface, one or more steps to implement the modification of the one or more execution attributes of the one or more target tasks of the plurality of tasks executed on the plurality of computing resources; and update the user interface to reflect the modification of the one or more execution attributes of the one or more target tasks of the plurality of tasks executed on the plurality of computing resources, wherein the updating of the user interface includes the projected improvement to the performance metric of the plurality of computing resources.

9. The computing device of claim 8, wherein the modification of the one or more execution attributes of the one or more target tasks of the plurality of tasks executed on the plurality of computing resources comprises at least one of:

changing an execution order of the one or more target tasks of the plurality of tasks executed on the plurality of computing resources; or changing an assignment of the plurality of computing resources for the one or more target tasks of the plurality of tasks executed on the plurality of computing resources.

10. The computing device of claim 8, wherein the plurality of tasks executed on the plurality of computing resources comprises graphics processing unit (GPU) application programming interface (API) calls, wherein constructing the dependency graph for the plurality of tasks executed on the plurality of computing resources comprises classifying dependencies as hard dependencies defined at least in part by one or more of driver and application programming interface (API) dependencies or soft dependencies defined at least in part by an execution order of the plurality of tasks executed on the plurality of computing resources, and wherein the validity of the dependency graph is maintained when the hard dependencies are satisfied.

11. The computing device of claim 8, wherein the performance metric of the plurality of computing resources comprises at least one of:

a reduction of total execution time of the plurality of computing resources;

a reduction of memory usage of the plurality of computing resources; or a reduction of latency of the plurality of computing resources.

12. The computing device of claim 8, wherein the one or more steps to implement the modification of the one or more execution attributes of the one or more target tasks of the plurality of tasks executed on the plurality of computing resources comprise at least one of:

changing an execution order of one or more function calls;

changing a first function call to instead use a second function call;

changing one or more compilation parameters; or changing one or more data structures.

13. A non-transitory computer readable medium storing instructions executable by a processor to:

access profile data from an execution of a plurality of tasks executed on a plurality of computing resources;

construct a dependency graph for the plurality of tasks executed on the plurality of computing resources based on the profile data;

cause a user interface to be presented, wherein the user interface includes a representation of the plurality of tasks executed on the plurality of computing resources;

receive, via the user interface, an input for a modification of one or more execution attributes of one or more target tasks of the plurality of tasks executed on the plurality of computing resources;

determine that the modification of the one or more execution attributes of the one or more target tasks of the plurality of tasks executed on the plurality of computing resources is projected to improve a performance metric of the plurality of computing resources while maintaining a validity of the dependency graph;

present, via the user interface, one or more steps to implement the modification of the one or more execution attributes of the one or more target tasks of the plurality of tasks executed on the plurality of computing resources; and update the user interface to reflect the modification of the one or more execution attributes of the one or more target tasks of the plurality of tasks executed on the plurality of computing resources, wherein the updating of the user interface includes the projected improvement to the performance metric of the plurality of computing resources.

14. The non-transitory computer readable medium of claim 13, wherein the modification of the one or more execution attributes of the one or more target tasks of the plurality of tasks executed on the plurality of computing resources comprises at least one of:

changing an execution order of the one or more target tasks of the plurality of tasks executed on the plurality of computing resources; or changing an assignment of the plurality of computing resources for the one or more target tasks of the plurality of tasks executed on the plurality of computing resources.

15. The non-transitory computer readable medium of claim 13, wherein the plurality of tasks executed on the plurality of computing resources comprises graphics processing unit (GPU) application programming interface (API) calls, wherein constructing the dependency graph for the plurality of tasks executed on the plurality of computing resources comprises classifying dependencies as hard dependencies defined at least in part by one or more of driver and application programming interface (API) dependencies or soft dependencies defined at least in part by an execution order of the plurality of tasks executed on the plurality of computing resources, and wherein the validity of the dependency graph is maintained when the hard dependencies are satisfied.

16. The non-transitory computer readable medium of claim 13, wherein the performance metric of the plurality of computing resources comprises at least one of:
   a reduction of total execution time of the plurality of computing resources;
   a reduction of memory usage of the plurality of computing resources; or
   a reduction of latency of the plurality of computing resources.

17. The non-transitory computer readable medium of claim 13, wherein the one or more steps to implement the modification of the one or more execution attributes of the one or more target tasks of the plurality of tasks executed on the plurality of computing resources comprise at least one of:
   changing an execution order of one or more function calls;
   changing a first function call to instead use a second function call;
   changing one or more compilation parameters; or
   changing one or more data structures.

\* \* \* \* \*